(12) United States Patent
Furlotti

(10) Patent No.: US 11,440,687 B2
(45) Date of Patent: Sep. 13, 2022

(54) STATION FOR SEALING THERMOFORMED CONTAINERS FOR PACKAGING LINES

(71) Applicant: I.M.A. INDUSTRIA MACCHINE AUTOMATICHE S.P.A IN SIGLA IMA S.P.A., Ozzano dell'Emilia (IT)

(72) Inventor: Filippo Furlotti, Traversetolo (IT)

(73) Assignee: I.M.A. INDUSTRIA MACCHINE AUTOMATICHE S.P.A IN SIGLA IMA S.P.A., Ozzano Dell'Emilia (IT)

( * ) Notice: Subject to any disclaimer, the term of this patent is extended or adjusted under 35 U.S.C. 154(b) by 342 days.

(21) Appl. No.: 16/481,697

(22) PCT Filed: Feb. 8, 2018

(86) PCT No.: PCT/EP2018/053212
§ 371 (c)(1),
(2) Date: Jul. 29, 2019

(87) PCT Pub. No.: WO2018/146214
PCT Pub. Date: Aug. 16, 2018

(65) Prior Publication Data
US 2020/0024015 A1    Jan. 23, 2020

(30) Foreign Application Priority Data
Feb. 10, 2017    (IT) .................. 102017000014707

(51) Int. Cl.
*B65B 7/28*    (2006.01)
*B29C 65/00*    (2006.01)
(Continued)

(52) U.S. Cl.
CPC .......... *B65B 7/2878* (2013.01); *B29C 66/849* (2013.01); *B65B 1/02* (2013.01);
(Continued)

(58) Field of Classification Search
CPC ... B29C 65/18; B29C 65/7885; B29C 66/112; B29C 66/131; B29C 66/242;
(Continued)

(56) References Cited

U.S. PATENT DOCUMENTS 3,245,858 A * 4/1966 Negoro ............... B29C 65/7885
                                                156/423
3,431,380 A * 3/1969 Butler ................. B29C 65/7894
                                                219/769
(Continued)

FOREIGN PATENT DOCUMENTS

CN    1158811 A    9/1997
CN    1640808 A    7/2005
(Continued)

OTHER PUBLICATIONS

International Search Report dated Apr. 10, 2018 re: Application No. PCT/EP2018/053212, pp. 1-3, citing: U.S. Pat. No. 3,755,987A, U.S. Pat. No. 4,816,110A and EP 3 078 600 A1.

(Continued)

*Primary Examiner* — Robert F Long
*Assistant Examiner* — Eduardo R Ferrero
(74) *Attorney, Agent, or Firm* — Cantor Colburn LLP

(57) ABSTRACT

A station for sealing thermoformed containers for a packaging line and a method for sealing the containers includes a sealing carousel which rotates continuously about a central axis and includes sealing heads which are radially spaced apart from said central axis. Each sealing head is adapted to
- receive at least one container to be sealed at a first, input, peripheral region, which is outside the sealing carousel;
- receive at least one closing seal at a second, input, peripheral region, which is outside the sealing carousel; and
- hold the closing seal and the container during the rotation of the sealing carousel and couple them together.

(Continued)

The station further releases the container complete with the closing seal at a third, output, peripheral region, which is outside the sealing carousel and angularly spaced from the first and from the second region.

9 Claims, 9 Drawing Sheets

(51) Int. Cl.
  *B65B 1/02* (2006.01)
  *B65B 43/50* (2006.01)
  *B65B 51/14* (2006.01)
  *B29K 701/12* (2006.01)
  *B29L 31/00* (2006.01)

(52) U.S. Cl.
  CPC ............ *B65B 7/2807* (2013.01); *B65B 43/50* (2013.01); *B65B 51/14* (2013.01); *B29K 2701/12* (2013.01); *B29L 2031/712* (2013.01)

(58) Field of Classification Search
  CPC ........ B29C 66/24221; B29C 66/53461; B29C 66/7392; B29C 66/8227; B29C 66/8242; B29C 66/83543; B29C 66/849; B65B 7/2807; B65B 7/2878; B65B 43/50; B65B 51/14; B65B 7/2842; B67C 2007/0066
  USPC ........ 53/329.2, 329.3, 329.4, 272, 276, 306, 53/308, 313
  See application file for complete search history.

(56) References Cited

U.S. PATENT DOCUMENTS

| | | | |
|---|---|---|---|
| 3,700,854 A * | 10/1972 | Beck | B31B 70/00 219/243 |
| 3,755,987 A | 9/1973 | Dardaine et al. | |
| 3,886,708 A * | 6/1975 | Guse | B29C 65/7841 53/329.4 |
| 3,964,237 A | 6/1976 | Johansen | |
| 4,152,566 A * | 5/1979 | Magerle | B29C 43/08 219/655 |
| 4,170,861 A * | 10/1979 | Snyder | C12M 29/00 53/381.4 |
| 4,306,849 A * | 12/1981 | Cress | B29C 53/50 425/305.1 |
| 4,411,720 A * | 10/1983 | Sager | B29C 65/08 156/580.2 |
| 4,547,645 A * | 10/1985 | Smith | B29C 66/83541 219/604 |
| 4,624,098 A * | 11/1986 | Trendel | B67B 3/206 53/317 |
| 4,691,500 A * | 9/1987 | Danforth | B65B 7/2878 53/374.6 |
| 4,719,739 A * | 1/1988 | Foldesi | B29C 65/80 53/298 |
| 4,726,173 A | 2/1988 | Giatti | |
| 4,816,110 A | 3/1989 | Foldesi et al. | |
| 4,941,306 A * | 7/1990 | Pfaffmann | B65B 7/2878 53/306 |
| 5,040,357 A * | 8/1991 | Ingemann | B29C 66/112 53/478 |
| 5,127,211 A * | 7/1992 | Mancini | B65B 9/042 53/284.5 |
| 5,363,629 A * | 11/1994 | Graffin | B65B 7/01 53/298 |
| 5,408,805 A * | 4/1995 | Graffin | B65B 7/2814 53/298 |
| 5,623,816 A * | 4/1997 | Edwards | B29C 66/91231 53/478 |
| 6,094,890 A | 8/2000 | Michellon et al. | |
| 6,165,114 A * | 12/2000 | Stahlecker | B29B 13/024 493/109 |
| 6,192,660 B1 * | 2/2001 | Moriyama | B65B 7/28 156/69 |
| 9,708,134 B2 * | 7/2017 | Rea | B65G 47/848 |
| 2001/0015056 A1 * | 8/2001 | Hiramoto | B29C 66/81431 53/479 |
| 2005/0150191 A1 * | 7/2005 | Taylor | B65B 3/34 53/471 |
| 2005/0160698 A1 * | 7/2005 | Caffeo | B65B 7/2807 53/290 |
| 2005/0274092 A1 * | 12/2005 | Rohret | B65B 61/005 53/478 |
| 2008/0299262 A1 * | 12/2008 | Reati | B65D 85/8043 426/84 |
| 2009/0056281 A1 | 3/2009 | Murray | |
| 2010/0107568 A1 * | 5/2010 | Inaba | B29C 65/7882 53/478 |
| 2011/0061347 A1 * | 3/2011 | Stoiber | B67B 3/26 53/558 |
| 2016/0009427 A1 * | 1/2016 | Rea | B65B 35/18 53/282 |
| 2016/0288939 A1 * | 10/2016 | Sawada | B29C 66/0222 |
| 2016/0355286 A1 * | 12/2016 | Cavazza | B29C 66/53462 |
| 2018/0147789 A1 * | 5/2018 | Cathcart | B29C 66/54 |
| 2018/0345587 A1 * | 12/2018 | Watts | B29C 66/9161 |
| 2018/0346159 A1 * | 12/2018 | Ichikawa | B29C 66/849 |

FOREIGN PATENT DOCUMENTS

| | | |
|---|---|---|
| CN | 101037144 A | 9/2007 |
| CN | 102030119 A | 4/2011 |
| CN | 105849001 A | 8/2016 |
| EP | 0299124 A2 | 1/1989 |
| EP | 3078600 A1 | 10/2016 |

OTHER PUBLICATIONS

IT Search Report dated Oct. 6, 2017 re: Application No. IT 2017000014707, pp. 1-8, citing: U.S. Pat. No. 3,755,987A, U.S. Pat. No. 4,816,110A and EP 3 078 600 A1.

Written Opinion dated Apr. 10, 2018 re: Application No. PCT/EP2018/053212, pp. 1-6, citing: U.S. Pat. No. 3,755,987A and U.S. Pat. No. 4,816,110A.

* cited by examiner

US 11,440,687 B2

STATION FOR SEALING THERMOFORMED CONTAINERS FOR PACKAGING LINES

TECHNICAL FIELD

The present disclosure relates to a station for sealing thermoformed containers, particularly for packaging lines such as FFS (form-fill-seal) packaging lines.

BACKGROUND

Known solutions are based on linear machines, such as for example the one described in U.S. Pat. No. 6,094,890. These solutions however have a series of limitations that are associated precisely with deployment in a production line. One of these limitations, for example, is an extremely low flexibility owing to the fact that the machine spacing is linked to the diameter of the containers, so that, when it becomes necessary to modify the latter, the machine has to be subjected to extensive modifications, which affect especially the overall length of the machine, with the consequence that a machine designed to work on containers that have a certain diameter cannot work on containers with a larger diameter, except at the expense of adaptations that are entirely uneconomical or incompatible with the space originally allocated to the machine.

It is known from U.S. Pat. No. 3,964,237 to provide a packaging line in which, in order to obtain thermoformed containers, thermoplastic sheet-like blanks are used, in particular disks, which are individually heated, thermoformed, filled and closed.

The advantage of the solution known from U.S. Pat. No. 3,964,237 is that, differently from other conventional solutions which entail molding a plurality of containers on a sheet of thermoplastic material fed by a spool, the volume occupied by such spool is considerably greater than that occupied by the sheet-like blanks of U.S. Pat. No. 3,964,237 in order to obtain the same number of containers.

A drawback of the solution known from U.S. Pat. No. 3,964,237 is that it operates at low speeds. In particular, the sealing station of U.S. Pat. No. 3,964,237 operates intermittently, to move first the disks and then the containers to various fixed stations of the machine, which require the disk or the container to be stationary while the associated operation is carried out by each station.

U.S. Pat. No. 3,755,987 discloses a machine for sealingly closing containers with a cap, comprising a drum with a plurality of sealing heads which are radially spaced apart from the carousel's central axis.

SUMMARY

The aim of the present disclosure is to provide a sealing station for packaging lines, in particular FFS packaging lines, which is capable of sealing containers filled with a product, preferably a loose product, even more preferably a loose food product, and which is capable of improving the prior art in one or more of the above mentioned aspects.

Within this aim, the disclosure provides a seal for containers that are formed from a sheet-like blank, by thermoforming, with a greater speed than the conventional solutions.

The disclosure enables the continuous sealing of thermoplastic sheet-like blanks.

The disclosure facilitates the manipulation of the sealed containers after the sealing itself.

The disclosure also provides a station for sealing thermoplastic containers and a corresponding method that can be used in an FFS (form-fill-seal) packaging line operating continuously.

Furthermore, the present disclosure overcomes the drawbacks of the prior art in a different manner to any existing solutions.

The disclosure also provides a sealing station that is highly reliable, easy to implement and low cost.

This aim and these and other advantages which will become better apparent hereinafter are achieved by providing a station for sealing thermoplastic containers for a packaging line, characterized in that it comprises a sealing carousel which can rotate continuously about a central axis which comprises a plurality of sealing heads which are radially spaced apart from said central axis, each sealing head being adapted to:

receive at least one container to be sealed at a first, input, peripheral region, which is outside the sealing carousel;
receive at least one closing seal at a second, input, peripheral region, which is outside the sealing carousel;
hold the closing seal and the container during the rotation of the sealing carousel and couple them together; and
release the container complete with the closing seal at a third, output, peripheral region, which is outside the sealing carousel and angularly spaced from the first and from the second region.

The aim and advantages of the disclosure are likewise achieved by providing a method of continuously sealing containers by way of closing seals, characterized in that it comprises the steps of:

continuously rotating a sealing carousel about a central axis, said sealing carousel having a plurality of sealing heads which are radially spaced apart from said central axis;
at a second, input, peripheral region, which is outside the sealing carousel, feeding a closing seal to said sealing heads, so that each sealing head that passes through said second region receives a respective closing seal;
at a first, input, peripheral region, which is outside the sealing carousel, feeding a container to be sealed to said sealing heads, so that each sealing head that passes through said first region receives a respective container;
during said rotation of the sealing carousel, holding and coupling the closing seal with the container, and
releasing said containers, sealed with the closing seal, to a third region which is outside the sealing carousel and is angularly spaced apart from the first and from the second region.

BRIEF DESCRIPTION OF THE DRAWINGS

Further characteristics and advantages of the disclosure will become better apparent from the description of a preferred, but not exclusive, embodiment of the sealing station according to the disclosure, which is illustrated by way of non-limiting example in the accompanying drawings wherein.

DETAILED DESCRIPTION OF THE DRAWINGS

Figure 1:
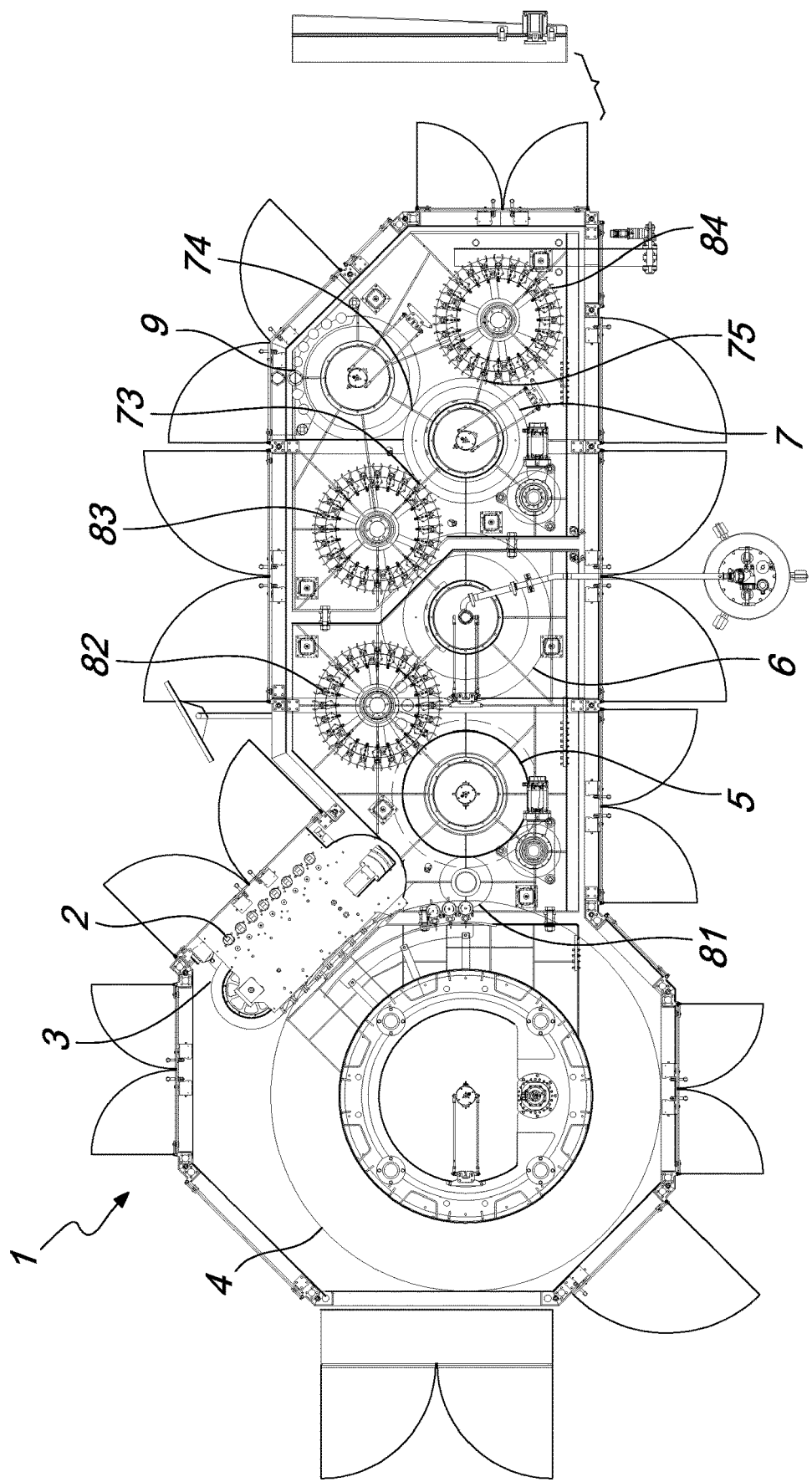
FIG. 1 is a plan view of an FFS (form-fill-seal) packaging line that uses the sealing station according to the disclosure.

With reference to FIGS. 1-9, an FFS packaging line for packaging containers fillable with loose material, generally designated by the reference numeral 1, comprises a magazine 2 of thermoplastic sheet-like blanks, station 3 for feeding the blanks to a subsequent station 4 for heating the blanks, a station 5 for thermoforming containers starting from such blanks, and a station 6 for filling the containers with the loose material, station 7 for sealing the filled containers by way of seals supplied by a station for feeding seals 9.

The thermoplastic sheet-like blanks comprise, or are entirely constituted by, a "token" of thermoformable plastic material, for example a thermoplastic polymer, preferably of the type suitable for foods, such as PS, HIPS, PET or the like. Generally, each thermoplastic sheet-like blank can have any shape in plan view, for example round, square, rectangular, oval, polygonal, that corresponds to the plan of the final container that it is desired to provide or of the rim of its mouth. In the preferred and illustrated embodiment, each blank G is adapted to the formation of a single container and has, but is not limited to, a disk-like shape.

Preferably, the containers to be sealed in the station 7 are tubs, adapted for example to be filled in the preceding filling station 6 with an edible substance in the form of a particulate or a fluid, for example with yogurt, in order to be then sealed with "peelable" sheet covers (for example plastic/aluminum laminates), which are referred to hereinafter as closing seals.

Figure 2:
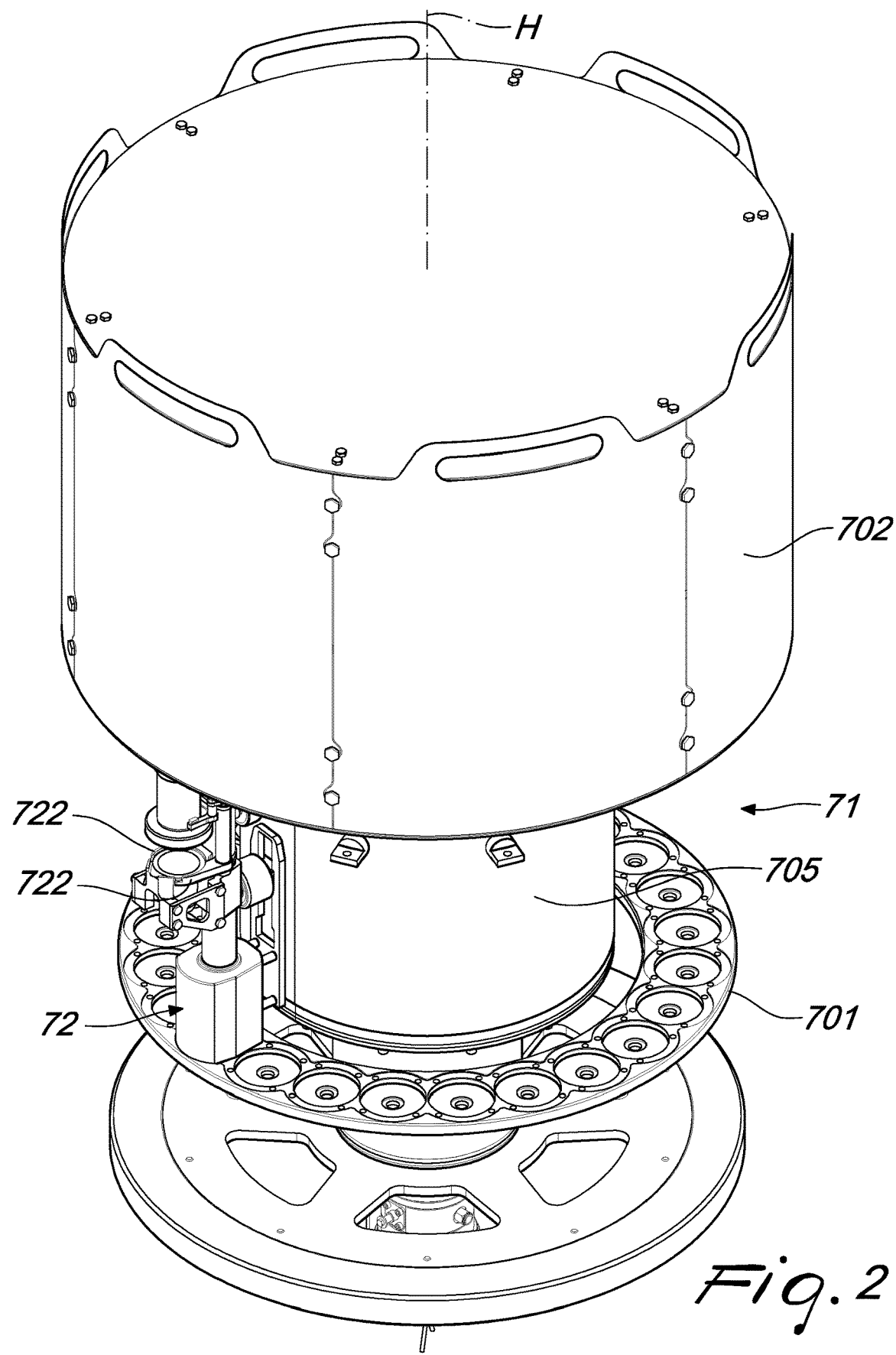
FIG. 2 is a perspective view of the sealing carousel used in the line in FIG. 1.
Figure 3:
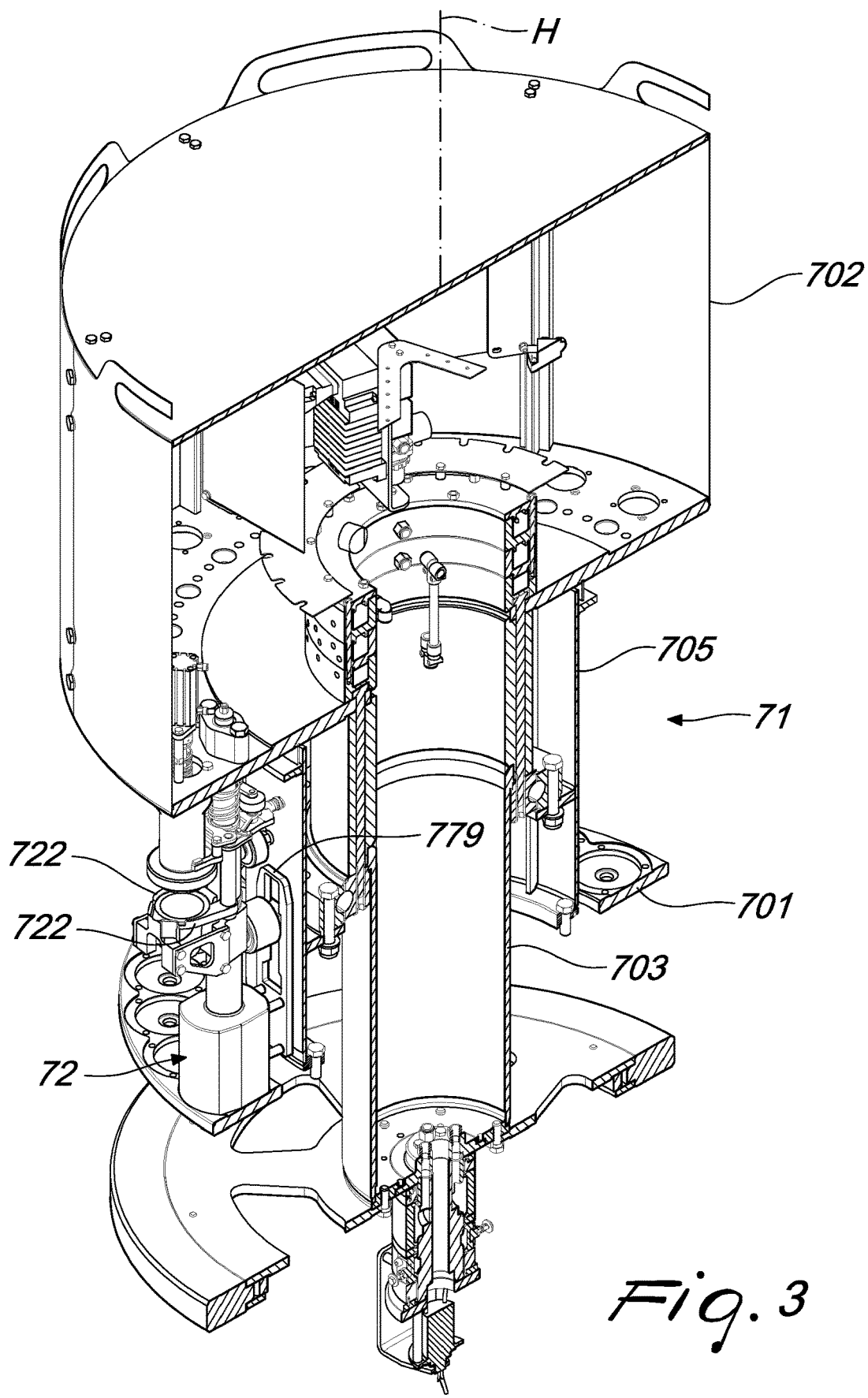
FIG. 3 is an axial cross-sectional perspective view of the carousel in FIG. 2.

The sealing station 7 comprises a sealing carousel 71, shown in detail in FIGS. 2 and 3, which can rotate continuously about a central axis H and which has a plurality of sealing heads 72 that are radially spaced apart from the central axis H and which are also shown in detail in FIGS. 4-9; for the sake of simplicity, FIGS. 2 and 3 show only one sealing head 72.

During the continuous rotation of the sealing carousel 71 about the central axis H, each sealing head 72 is adapted to:
receive at least one container C to be sealed at a first, input, peripheral region 73, which is outside the sealing carousel 71,
receive at least one closing seal S at a second, input, peripheral region 74, which is outside the sealing carousel 71 and angularly spaced apart from the first peripheral region 73 with respect to the central axis H,
hold the closing seal S and the container C during the rotation of the sealing carousel 71 and stably couple them together,
release the container C complete with closing seal S thus provided to a third, output, peripheral region 75, which is outside the sealing carousel 71 and angularly spaced apart from the first and from the second region 73, 74 with respect to the central axis H.

In the first peripheral region 73 there can be an input star conveyor 83 which is adapted to feed containers C to the sealing carousel 71, and in the second peripheral region 74 there can be the carousel for feeding closing seals 91 which is adapted at least to continuously feed closing seals S to the sealing carousel 71, while in the third peripheral region 75 there can be an output star conveyor 84.

With reference to the direction of rotation of the sealing carousel 71 in operation, the first peripheral region 73 is preferably downstream of the second peripheral region 74.

The sealing carousel 71, in particular, can comprise a lower support ring 701, which is connected to the sealing heads 72, an upper chamber 702 which is connected to the ring 701 and to the central hub 703, and a fixed partition 705 for supporting the radial cams (not shown) for moving the components of the sealing heads 72.

The continuous rotation of the sealing carousel 71 about the central axis H can be obtained, for example, by way of a direct-drive motor on the hub 703 of the carousel 71 or a motor connected to such hub by way of a transmission.

Each sealing head 72 can comprise an assembly for gripping and positioning 720, an assembly for picking up and sealing 750 and an abutment assembly 770.

The assembly for gripping and positioning 720 is configured at least to support and move, at various moments during operation, the container C and the closing seal S which arrive from the respective first and second region 73 and 74.

The assembly for picking up and sealing 750 is designed at least to pick up the closing seal S and to perform the operation of mutually stably coupling this seal and the container C. To this end, the assembly for picking up and sealing 750 is equipped at least with:
a pickup piston 751;
means for moving the piston 752;
means for activating the piston 753;
means for sealing 755.

The means for moving the piston 752 and the means for activating the piston 753 are preferably pneumatic. The piston 751 comprises a head with a sucker gripping device 754 and is adapted to pick up and retain the closing seal S, so that the container C can be moved along its vertical axis for the subsequent coupling action performed by the sealing means 755.

The abutment assembly 770 is designed at least to cooperate with the above assembly for picking up and sealing 750 in order to push it and/or act as an abutment during the operation of mutual coupling and fixing between the closing seal S and the container C.

Optionally the abutment assembly 770 is designed also, or only, to support a closing seal S (which is then picked up by the piston 751) and/or a container C.

In such coupling operation, the peripheral edges of the seal S and of the container C are pressed against each other and, to this end, they are interposed between the abutment assembly 770 and the sealing means 755.

Each sealing head 72 is associated with a dedicated upright column 760 on which all or some of its components move and/or are supported. The upright column 760 is fixed on the ring 701 and extends vertically with its axis parallel to the rotation axis H of the sealing carousel 71.

Descending into more detail about the embodiment shown, now with reference to FIGS. 4-9 as well, each assembly for gripping and positioning 720 can move slideably on the respective column 760 and to this end comprises a guide sleeve 721 that can slide on the column 760.

Figure 4:
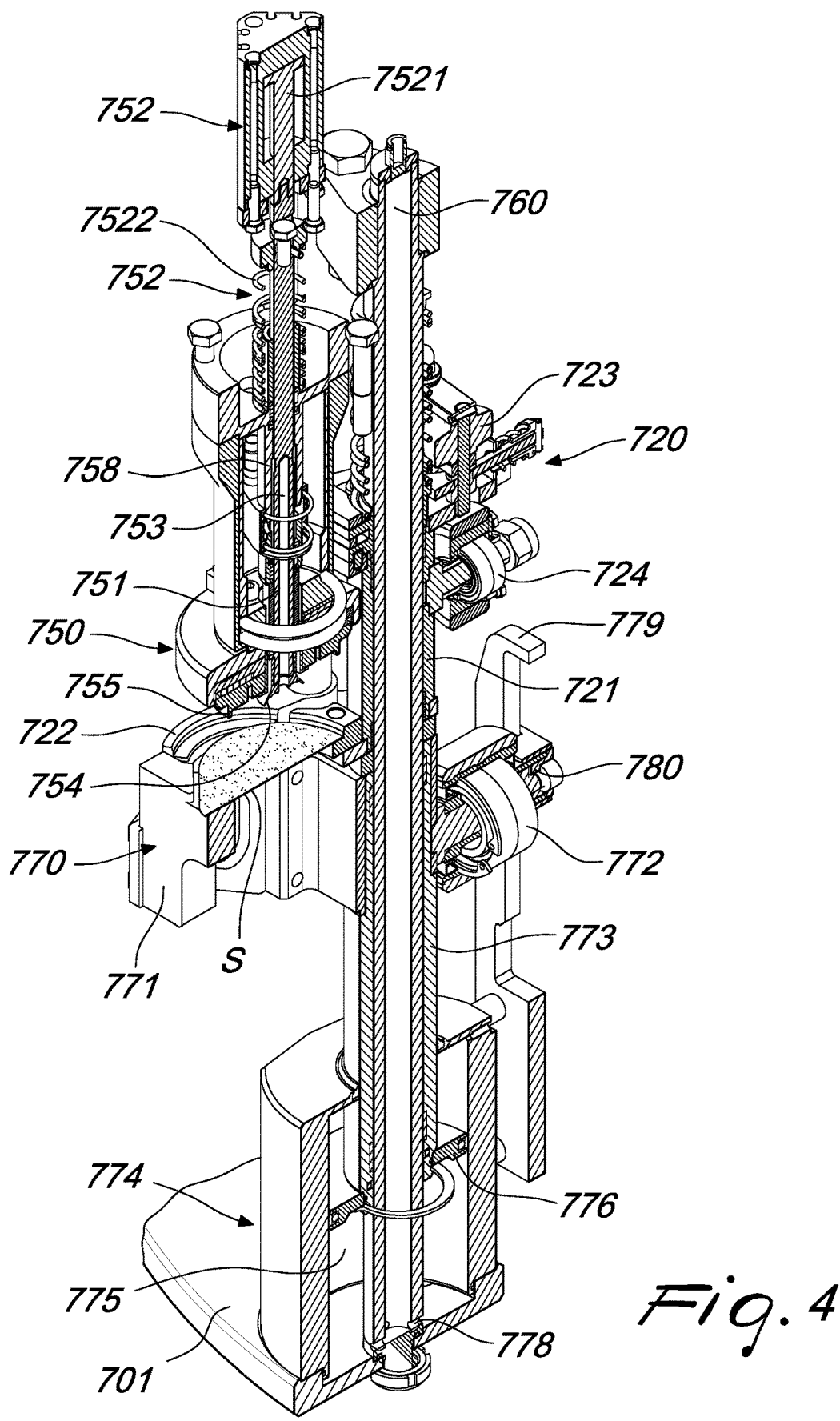
FIGS. 4 to 9 are axial cross-sectional perspective views of a sealing head of the carousel in FIG. 2, at consecutive moments of processing during the sealing of a container.
Figure 5:
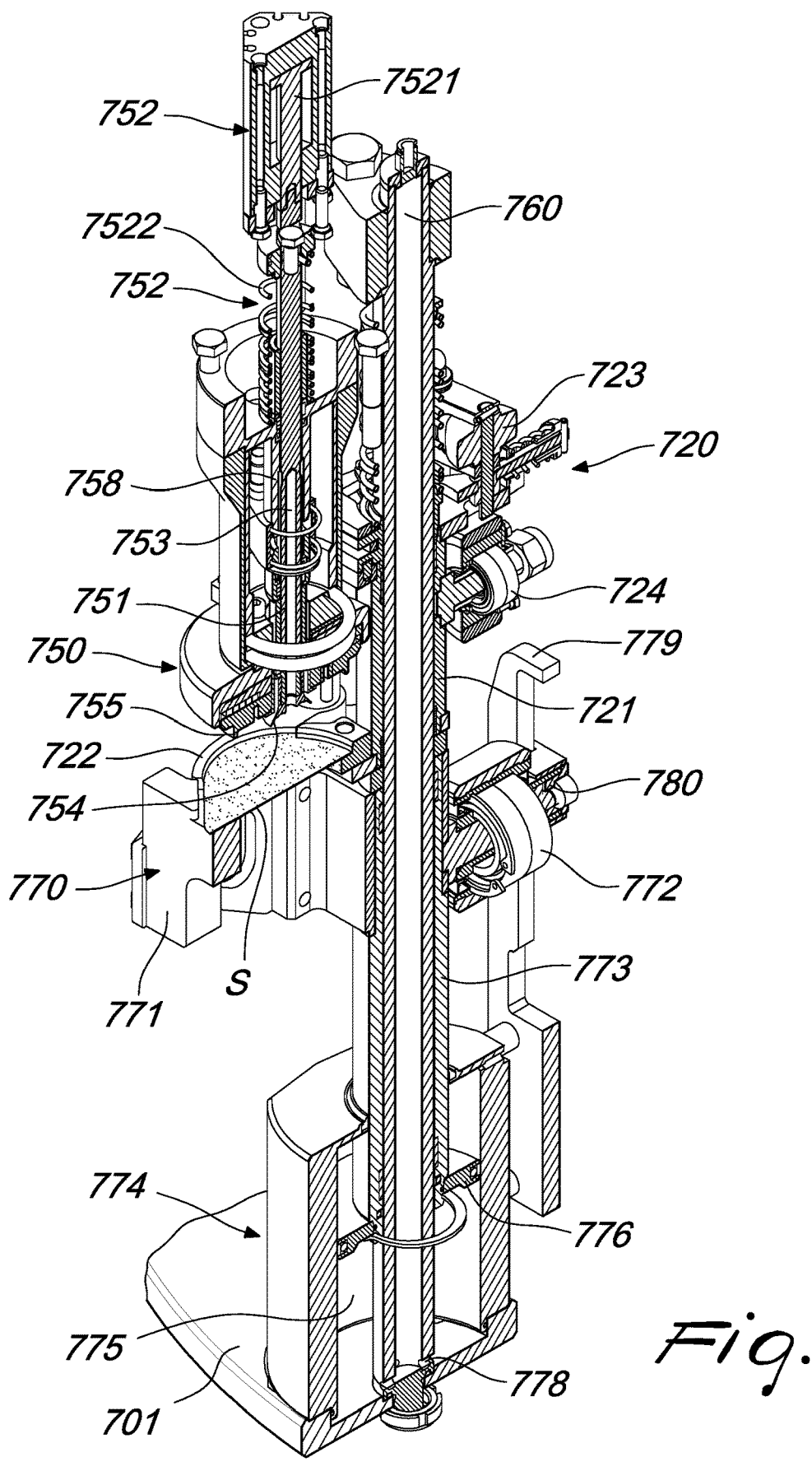
Figure 6:
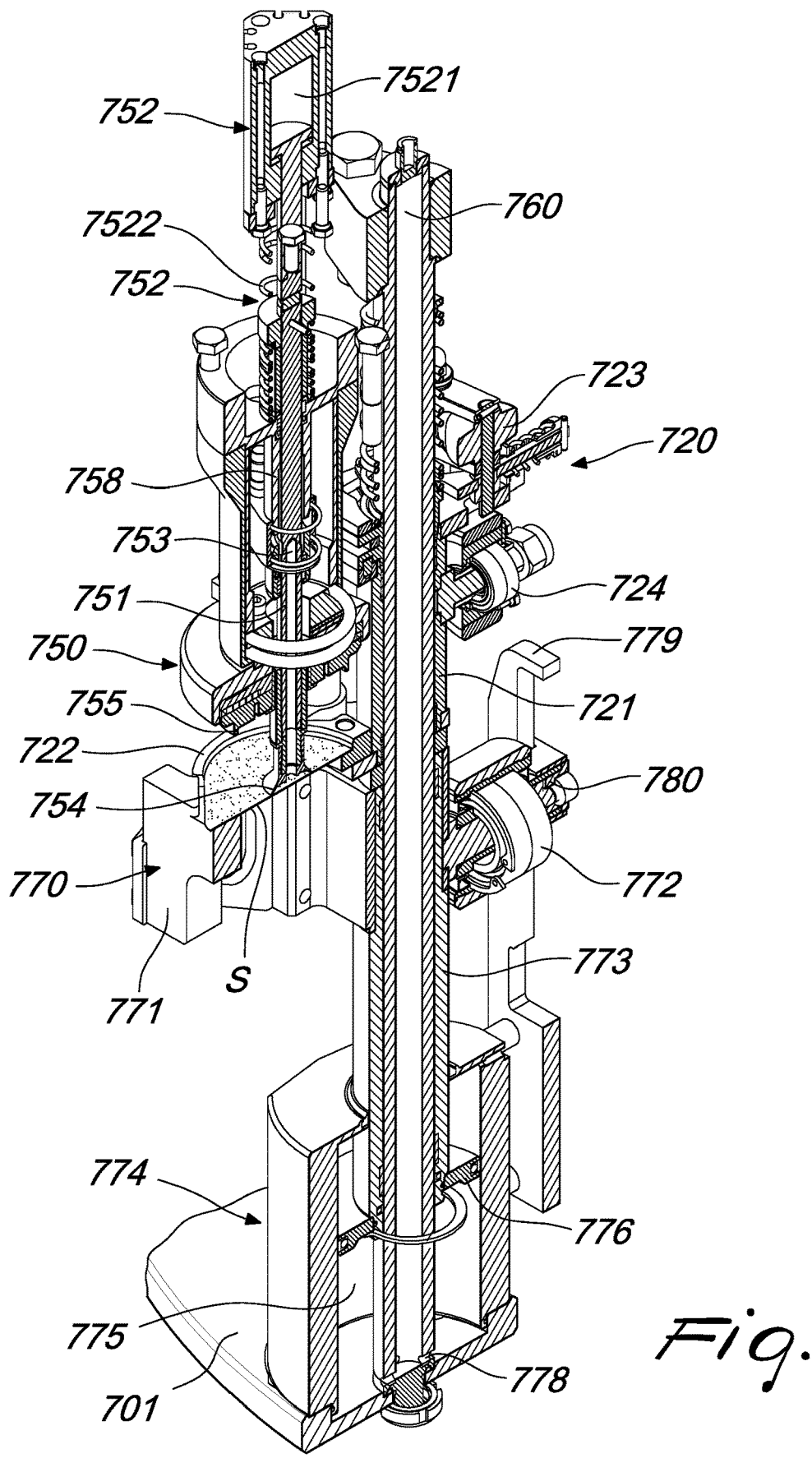
Figure 7:
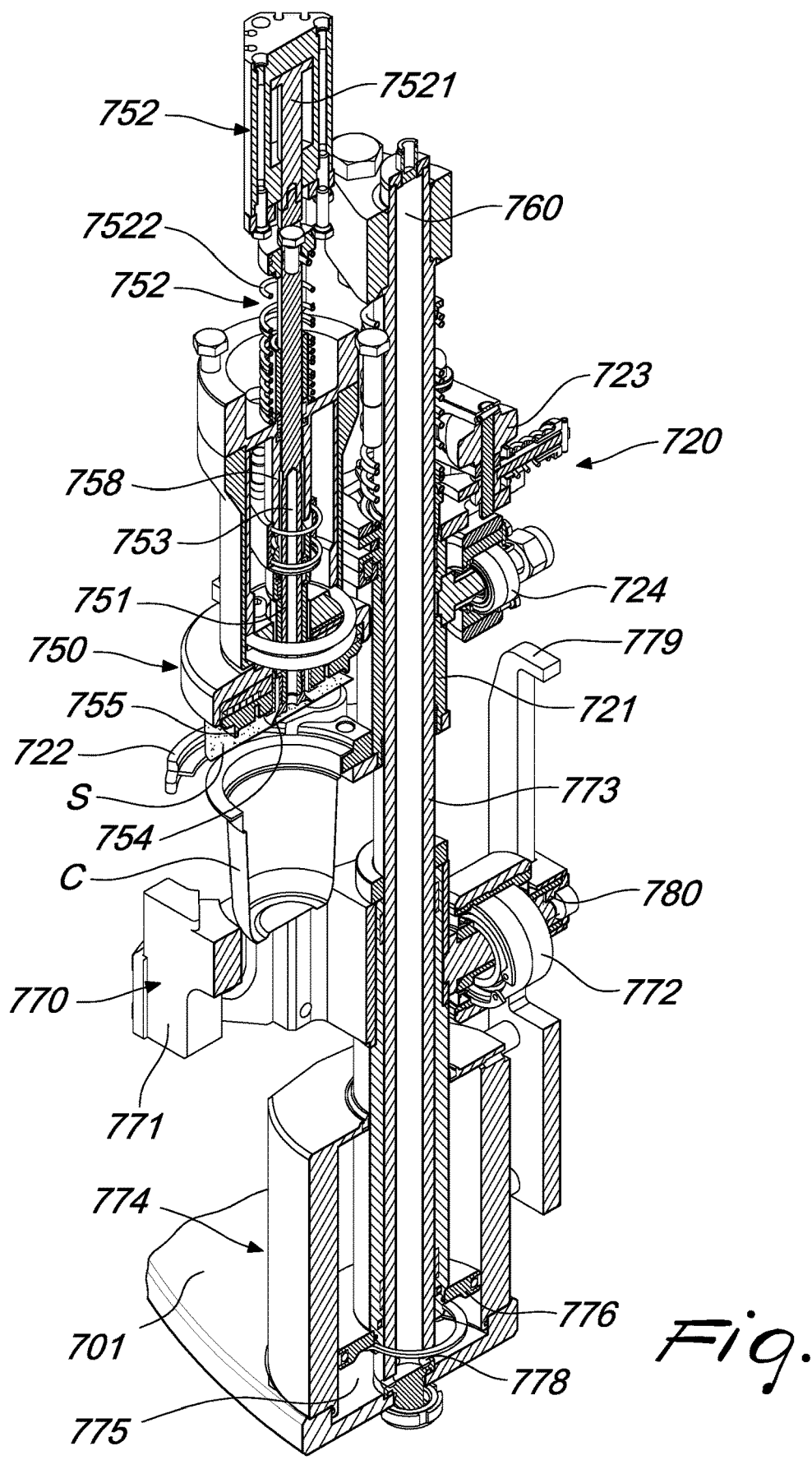

The assembly for gripping and positioning 720 in the preferred embodiment shown comprises, furthermore, mutually opposing pincers 722, which are substantially arc-shaped, and a first cam-following roller 723 for moving the pincers which, in the rotary movement of the sealing head 72 owing to the rotation of the sealing carousel 71, cooperates with a dedicated fixed cam (not shown) which determines the movement of the pincers 722 between two limit positions: a resting position, in which the pincers 722 are close together (as in FIGS. 5, 6, 8, 9), and a release position, in which the pincers 722 are apart (as in FIGS. 4 and 7).

The pincers 722 can thus translate parallel to the column 760 by virtue of a second cam-following roller 724 which is connected to the sleeve 721 and cooperates, during the rotary movement of the sealing carousel 71, with a dedicated fixed cam (not shown).

The underlying abutment assembly 770 comprises a contoured support 771 and a dedicated sleeve 773 that can slide on the column 760; to this end the sleeve 773 is connected to a respective cam-following roller 772 which cooperates in the rotary movement of the station 72 on the sealing carousel 71, with a dedicated fixed cam (not shown).

Working against the cam-following roller 772 on the sleeve 773 is an actuator, preferably pneumatic, 774 which is fitted coaxially with the column 760 and which comprises a variable-volume chamber 775 in which a hermetic partition 776 is moved under the pressure of compressed air fed to the chamber by virtue of the openings 778. In operation, the cam (not shown) moves the cam-following roller 772 downward, contrasting the opposite thrust imparted by the partition 776 and in this way maintaining a condition of constant gripping contact between the roller 772 and the corresponding cam. The sleeve 773, and therefore in the final analysis the contoured support 771, are moved vertically parallel to the column 760.

As an alternative to the hydraulic actuator 774, there can be a spring or other, equivalent solutions adapted to act against the roller 772.

Furthermore the hydraulic actuator 774 compresses the container C and the seal S when the two are rendered integral.

The cams (not shown) are fixed to the fixed external partition 705, which does not rotate together with the ring 701 of the sealing carousel 71.

Figure 8:
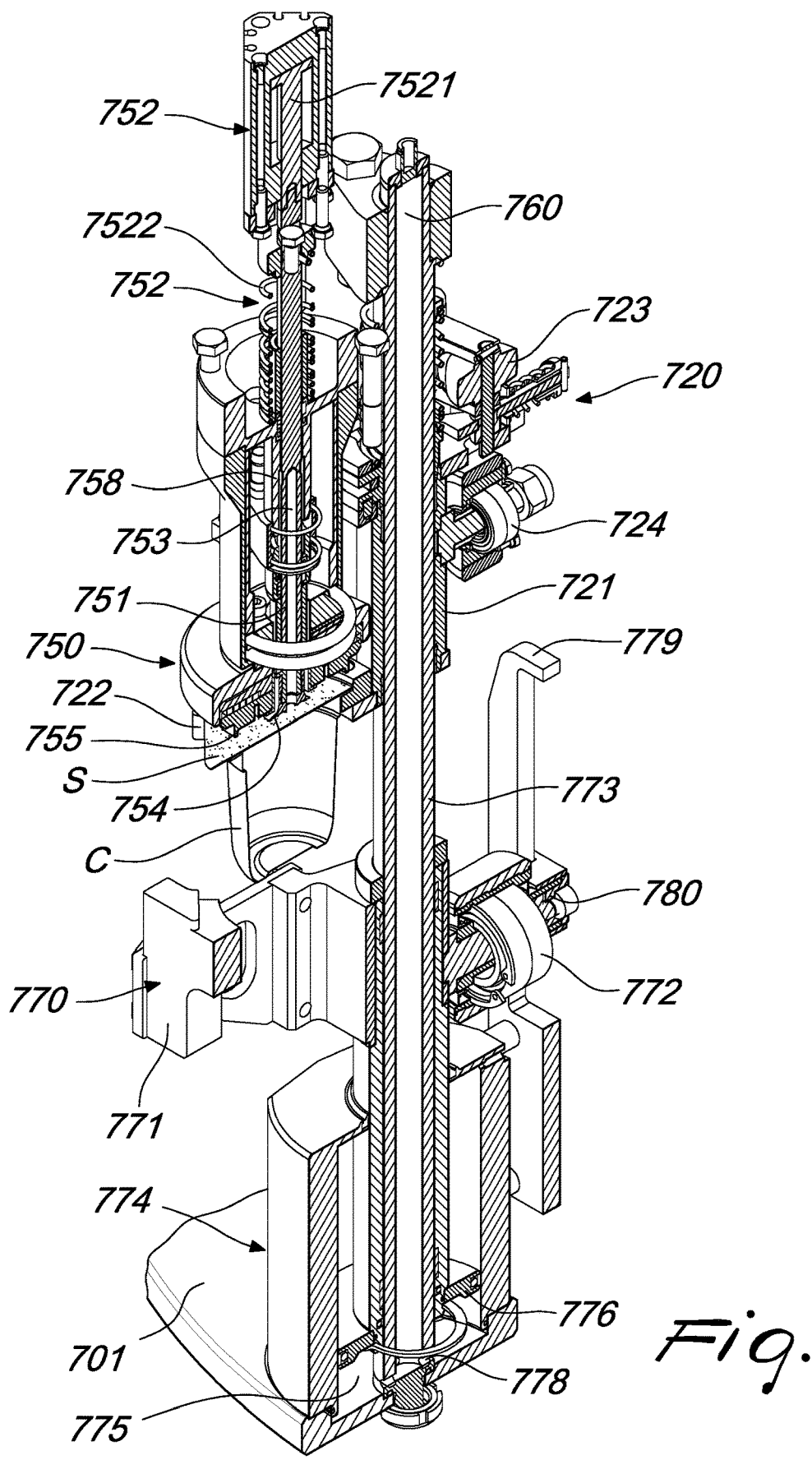
Figure 9:
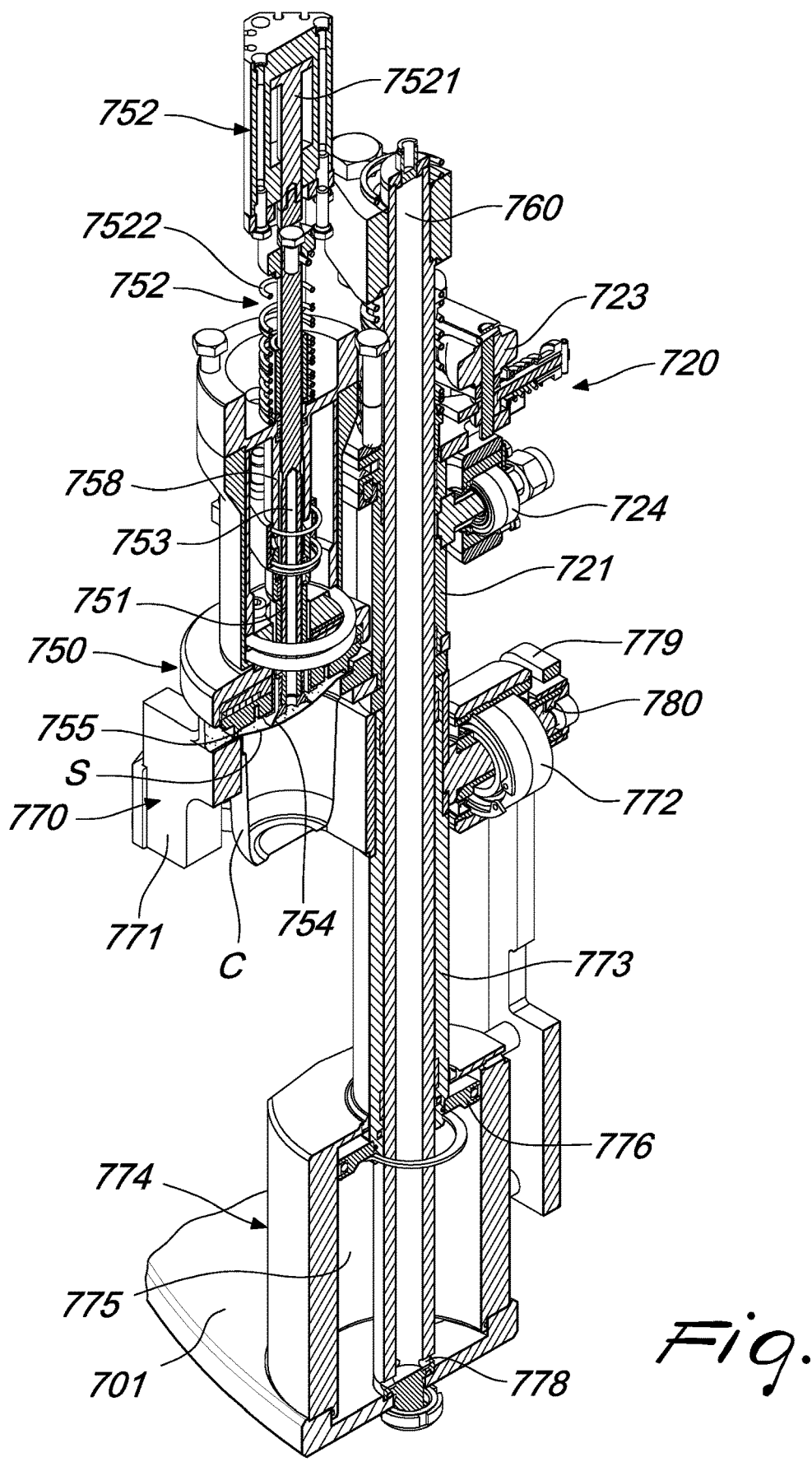

The contoured support 771 and the pincers 722 have substantially complementary shapes so as to define, when they are close together, a substantially continuous resting surface on which both the closing seal S (as in FIGS. 5 and 6) and, in a subsequent step, the container C rests peripherally (FIGS. 8 and 9).

Returning briefly to the abutment assembly 770, this further comprises an anti-rotation device, which in turn is provided with a guide 779 which can rotate together with the column 760 and is provided with an oblong slot, which is parallel to the column 760 and in which a runner 780 slides which is integral with the sleeve 773.

Turning now to describe the assembly for picking up and sealing 750, in this we have the pickup piston 751 which moves in a coaxial cylindrical guide 758, between a retracted condition (FIGS. 4, 5, 7, 8, 9) and an extended condition, i.e. for picking up (FIG. 6), in which it protrudes in the direction of the abutment assembly 770 in order to retrieve the closing seal S.

The displacement of the piston between the two conditions occurs by virtue of movement means 752 which are preferably pneumatic: in this embodiment the movement means comprise a pneumatic actuator 7521 and a contrasting spring 7522 which act on and against the piston 751.

The activation means 753 of the piston are designed to activate the head with a sucker gripping device 754 in order to retrieve the closing seal S from the pincers 722. If the activation means 753 of the piston are pneumatic, the body of the piston 751 is provided with a passage channel connected to the sucker 754 in order to generate the partial vacuum that makes it possible to retain the closing seal S.

With regard to the means for sealing 755, these can vary according to requirements and to the type of sealing that it is intended to provide between the closing seal S and the container C.

In the preferred solution, the sealing means 755 comprise a peripheral heating lip which protrudes in the direction of the abutment assembly 770 and is designed to come into contact with the edges of the closing seal S in order to stably couple it to the container C.

With regard to the closing seal S, in the preferred embodiment, this is conventional and it comprises a flexible sheet (mono- or multilayer) which is provided with a heat-sealable film on the face directed toward the container C. For example, the film could be made with a layer of adhesive that can be thermally activated and/or with an adapted thermoplastic material. Both the form and the implementation of the closing seal S can vary according to the applications and the requirements.

Turning now to describe the operation of the sealing station 7 during the continuous rotation of the sealing carousel 71, referring, for the sake of simplicity, to a single sealing head, the closing seal S is first fed to the head 72, for example by way of the station 9 (FIG. 4). The closing seal S initially rests only on a fixed curved surface interposed between the pincers 722, while the pincers 722 are in the open condition in order to facilitate the step of radial insertion of the closing seal S between them. In this step the contoured support 771 can be positioned close to the pincers as shown in FIG. 4, or, in an alternative embodiment, it can be in a lowered position.

At a later time (FIG. 5), the pincers 722 are closed and optionally the contoured support 771 performs a translational motion toward them. The closing seal S rests perimetrically both on the pincers 722 and on the contoured support 771, so as to be stable for the subsequent pick-up step.

In such pick-up step (FIG. 6) the sucker gripping device 754 of the piston 751 is made to descend until it comes into contact with the closing seal S. Substantially simultaneously, the means for activating the piston 753 are actuated, thus ensuring that the sucker gripping device 754 is correctly coupled to the closing seal S.

At a later time (FIG. 7) the piston 751 is made to go back up and it is brought to the condition in which it is spaced apart from the contoured support 771, in so doing moving the closing seal S away as well. Substantially simultaneously, the abutment assembly 770 performs a translational motion away from the assembly for picking up and sealing 750 and the pincers 722 are opened. In this manner, sufficient space is created to position the container C, which is fed radially from the star conveyor 83. In FIG. 7, the container C is still supported (partially) by the star conveyor 83, which however is not shown for the sake of simplicity.

Subsequently (FIG. 8) the pincers 722 close, thus supporting the container C, and they are moved toward the assembly for picking up and sealing 750, as a consequence moving the container C toward the closing seal S hung from the sucker 754, and preferably bringing them into contact.

At a later time (FIG. 9) the abutment assembly 770 is moved toward the assembly for picking up and sealing 750, thus compressing the peripheral edges of the closing seal S and of the mouth of the container C against the means for sealing 755.

In this condition the means for sealing 755 are activated, thus effecting the sealing of the container C with the closing seal S.

When the container C thus sealed reaches the third region 75, it is then unloaded by the station 7, for example toward an output star conveyor 84.

The overall operation of the sealing station 7 is evident from the foregoing description.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102017000014707 (UA2017A000852) from which this application claims priority are incorporated herein by reference.

The invention claimed is:

1. A station for sealing thermoplastic containers for a packaging line comprising: a sealing carousel configured to rotate continuously about a central axis and which has a plurality of sealing heads radially spaced apart from said central axis, each sealing head being adapted to:
   receive at least one container to be sealed at a first, input, peripheral region which is outside the sealing carousel;
   receive at least one closing seal at a second, input, peripheral region, which is outside the sealing carousel;
   hold the closing seal and the container during the rotation of the sealing carousel and couple them together;
   release the container complete with the closing seal at a third, output, peripheral region, which is outside the sealing carousel and angularly spaced apart from the first and from the second region,
   wherein each sealing head comprises gripping and positioning means, picking up and sealing means, and an abutment means, wherein:
   the gripping and positioning means is adapted at least to support and move, at various moments during operation, the container and the closing seal which arrive from the respective first and second region;
   the picking up and sealing means is adapted at least to pick up the closing seal and to perform the operation of mutually coupling this closing seal and the container, wherein the picking up and sealing means is equipped at least with a piston configured to pick up the closing seal, movement means configured to move the piston toward/away from the abutment means, activation means configured to activate a piston grip condition in which the piston couples temporarily with the closing seal, and sealing means; and
   the abutment means is adapted at least to support the closing seal and the container and to cooperate with the picking up and sealing means during an operation of mutual coupling and fixing between the closing seal and the container.

2. The sealing station according to claim 1, wherein the sealing carousel comprises a lower support ring and an upper chamber which is connected to the ring by way of a central hub and comprises a fixed partition for supporting cams.

3. The sealing station according to claim 1, wherein each sealing head also comprises a supporting column, on which the gripping and positioning means, the picking up and sealing means and the abutment means are mounted so that they can slide.

4. The sealing station according to claim 3, wherein the gripping and positioning means can move on the respective supporting column and comprises:
   a guide sleeve, which can slide on the supporting column;
   mutually opposite pincers;
   a first cam-following roller for moving the pincers, which is articulated to the pincers in order to cause a movement of the pincers between a resting position, in which the pincers are close together, and a release position, in which the pincers are apart;
   a second cam-following roller at least for causing a translation of the pincers parallel to the supporting column.

5. The sealing station according to claim 4, wherein the abutment means comprises:
   a contoured support;
   a sleeve which can slide on the supporting column;
   a cam-following roller, which is connected to the sleeve in order to cause a movement of the sleeve on the supporting column;
   a preferably pneumatic actuator, which works against the cam-following roller and is connected to the sleeve.

6. The sealing station according to claim 5, wherein the contoured support and the pincers have substantially complementary shapes in order to define, when they are close together, a substantially continuous resting surface for the peripheral resting of the closing seal or of the container.

7. The sealing station according to claim 1, wherein the movement means and the activation means of the piston are preferably pneumatic, the piston comprising a head with a sucker gripping device for picking up and holding the closing seal.

8. The sealing station according to claim 1, wherein the sealing means comprise a peripheral heating lip which protrudes in the direction of the abutment means and is designed to make contact with edges of the closing seal in order to stably couple it to the container.

9. A method of continuously sealing containers by way of closing seals, the method including the following steps:
   continuously rotating a sealing carousel about a central axis, said sealing carousel having a plurality of sealing heads which are radially spaced apart from said central axis,
   at a second, input, peripheral region, which is outside the sealing carousel, feeding a closing seal to said sealing heads, so that each sealing head that passes through said second region receives a respective closing seal,
   at a first, input, peripheral region, which is outside the sealing carousel, feeding a container to be sealed to said sealing heads, so that each sealing head that passes through said first region receives a respective container,
   during said rotation of the sealing carousel, holding and coupling the closing seal with the container;
   releasing said containers, sealed with the closing seal, to a third region which is outside the sealing carousel and is angularly spaced apart from the first and from the second region,
   wherein each sealing head comprises gripping and positioning means, picking up and sealing means, and an abutment means, wherein the method comprises the steps of:
   supporting and moving, at various movements during operation, the container and the closing seal which arrive from the respective first and second region using the gripping and positioning means;
   picking up the closing seal and performing the operation of mutually coupling this closing seal and the container using the picking up and sealing means, the picking up and sealing means having at least a pickup piston adapted to pick up the closing seal, movement means configured to move the piston toward/away from the abutment means, activation means configured to activate a piston grip condition in which the piston couples temporarily with the closing seal, and sealing means;

supporting the closing seal and the container and cooperating with the picking up and sealing means during an operation of mutual coupling and fixing between the closing seal and the container using the abutment means.

* * * * *